United States Patent [19]

Rohani et al.

[11] Patent Number: 5,020,107

[45] Date of Patent: May 28, 1991

[54] LIMITED VOCABULARY SPEECH RECOGNITION SYSTEM

[75] Inventors: Kaymar Rohani, Ft. Worth; R. Mark Harrison, Grapevine, both of Tex.

[73] Assignee: Motorola, Inc., Schaumburg, Ill.

[21] Appl. No.: 445,518

[22] Filed: Dec. 4, 1989

[51] Int. Cl.⁵ .............................................. G10L 7/08
[52] U.S. Cl. .................................................... 381/43
[58] Field of Search .................................. 381/41–46, 381/110; 364/513.5

[56] References Cited

U.S. PATENT DOCUMENTS

| | | | |
|---|---|---|---|
| 4,053,710 | 10/1977 | Advani et al. | 179/1 SB |
| 4,426,733 | 1/1984 | Brinig | 455/79 |
| 4,590,604 | 5/1986 | Feilchendeld | 381/42 |
| 4,720,802 | 1/1988 | Damoulakis et al. | 364/513.5 |
| 4,731,811 | 3/1988 | Dubus | 379/58 |
| 4,737,976 | 4/1988 | Borth et al. | 379/58 |
| 4,776,016 | 10/1988 | Hansen | 381/42 |
| 4,797,924 | 1/1989 | Schnars et al. | 381/43 |
| 4,797,929 | 1/1989 | Gerson et al. | 381/43 |
| 4,827,520 | 5/1989 | Zeinstra | 381/43 |

OTHER PUBLICATIONS

Voice Processing Corp., News Release Brochure, Date Unknown.
AT&T, VRM Brochure, Date Unknown.

*Primary Examiner*—Gary V. Harkcom
*Assistant Examiner*—John A. Merecki
*Attorney, Agent, or Firm*—Robert S. Babayi; Daniel K. Nichols

[57] ABSTRACT

Various functions (or portions thereof) are associated with some of the words or instructions recognizable by a speaker independent voice recognition device (128). This association is presented to an operator via one or more menus (200a–200d) so that the operator may select any of several functions by use of a limited set of speaker independent commands.

8 Claims, 3 Drawing Sheets

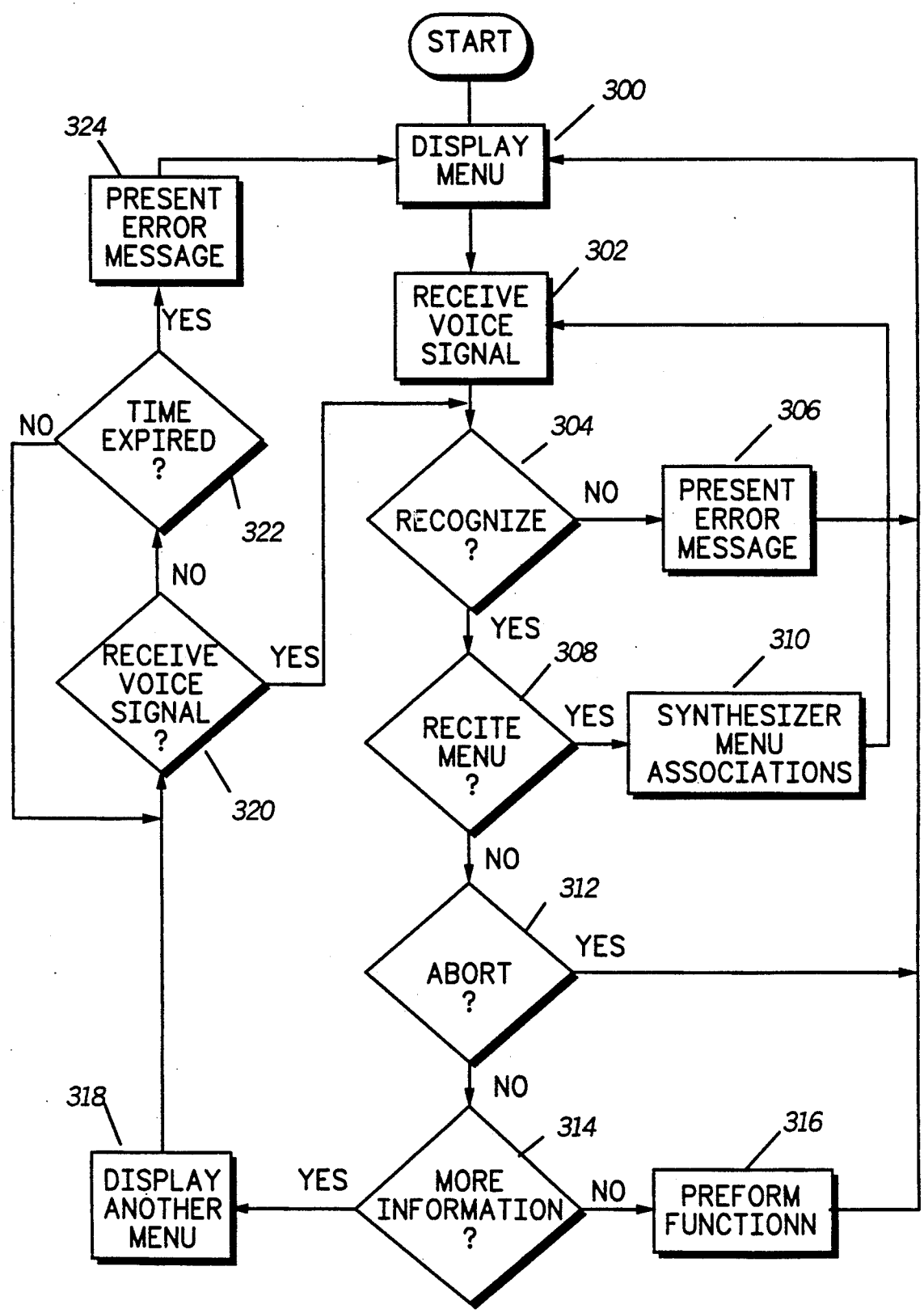

LIMITED VOCABULARY SPEECH RECOGNITION SYSTEM

TECHNICAL FIELD

The invention relates generally to speech recognition, and more particularly to speaker independent speech recognition systems, and is particularly directed toward providing a broad range of voice control employing a limited vocabulary speaker independent speech recognition system.

BACKGROUND

Many individuals in contemporary society communicate more effectively via spoken instructions or commands than by any other communication medium. Accordingly, it would be advantageous to have many devices (or equipment) used by contemporary society to be at least partially controllable by voice commands. However, to fully operate many devices (or equipment) known today would require a large vocabulary of recognizable words or commands to be able to effectuate a sufficient level of control over the device (or equipment) being operated.

Some designers of voice recognition equipment have attempted to utilize speaker dependent voice recognition technology to accomplish such controls. As is known, speaker dependent technology utilizes pre-stored voice templates to recognize the voice of a particular individual to perform specified functions that relate to a predetermined set of recognized words. Speaker dependent technology is often recognized as being inferior to speaker independent technology in that the speaker dependent device must be programmed (trained) to recognize each individual operator. Training is commonly understood to be a process by which an individual repeats a predetermined set of words a sufficient number of times so that an acceptable template is formed. Training is often a time consuming process and the method and manner of storing a sufficiently large number of templates (so as to allow an acceptable number of individuals to operate the same piece of equipment) is often prohibitively large. To compensate for this, other individuals have conceived of many different means for rapidly replacing the template of one individual with the template for another individual so as to "reprogram" the device to recognize the voice commands of a new individual.

Speaker independent technology does not rely on a set of particularized trained voice templates to recognize the voice commands. Instead, the speaker independent device is programmed to recognize the voice commands of several (potentially any) individuals (taking into account the differences in speech patterns, such as inflections, pitch, accents, and other variations in spoken words) so as to reliably identify the particular command being spoken by number of people. However, speaker independent technology requires significantly more sophisticated processing technology and hence contemporary speaker independent devices have been constrained to a limited number of recognizable words.

Known speaker independent devices have concentrated primarily on recognizing the numbers zero through nine, and certain limited commands to effectuate the voice controlled dialing of a telephone or the like. Such technology is insufficient to control many other contemporary devices, such as a two-way radio frequency transceiver, that requires a significantly large number of commands to achieve an acceptable level of operation. This is unfortunate as voice control of a two-way mobile radio would be highly desirable so as to alleviate the need to divert a driver's attention from operating the vehicle to manipulate or adjust one or more control knobs or buttons on the radio. Thus, voice control of mobile radios and the like have been confined to speaker dependent technology with their associated problems of reprogramming (training) so that various members of a police department or other organization can use the same radio. Accordingly, a need exists in the art to provide for voice control of radio (and other devices) without resorting to complicated processing or programming techniques as required in the past.

SUMMARY OF THE INVENTION

Briefly, according to the invention, various functions (or portions thereof) are associated with some of the words or instructions recognizable by a speaker independent voice recognition device. This association is presented to an operator so that the operator may select any of several functions by use of a limited set of speaker independent commands.

In another aspect of the invention, the association at any particular moment between the speaker independent instructions and their associated functions (or portions of functions) is provided to the operator via display and/or synthesized voice.

BRIEF DESCRIPTION OF THE DRAWINGS

FIG. 3 is a flow diagram illustrating the operation of the communication device of FIG. 1 in accordance with the present invention.

DETAILED DESCRIPTION OF THE PREFERRED EMBODIMENT

Figure 1:
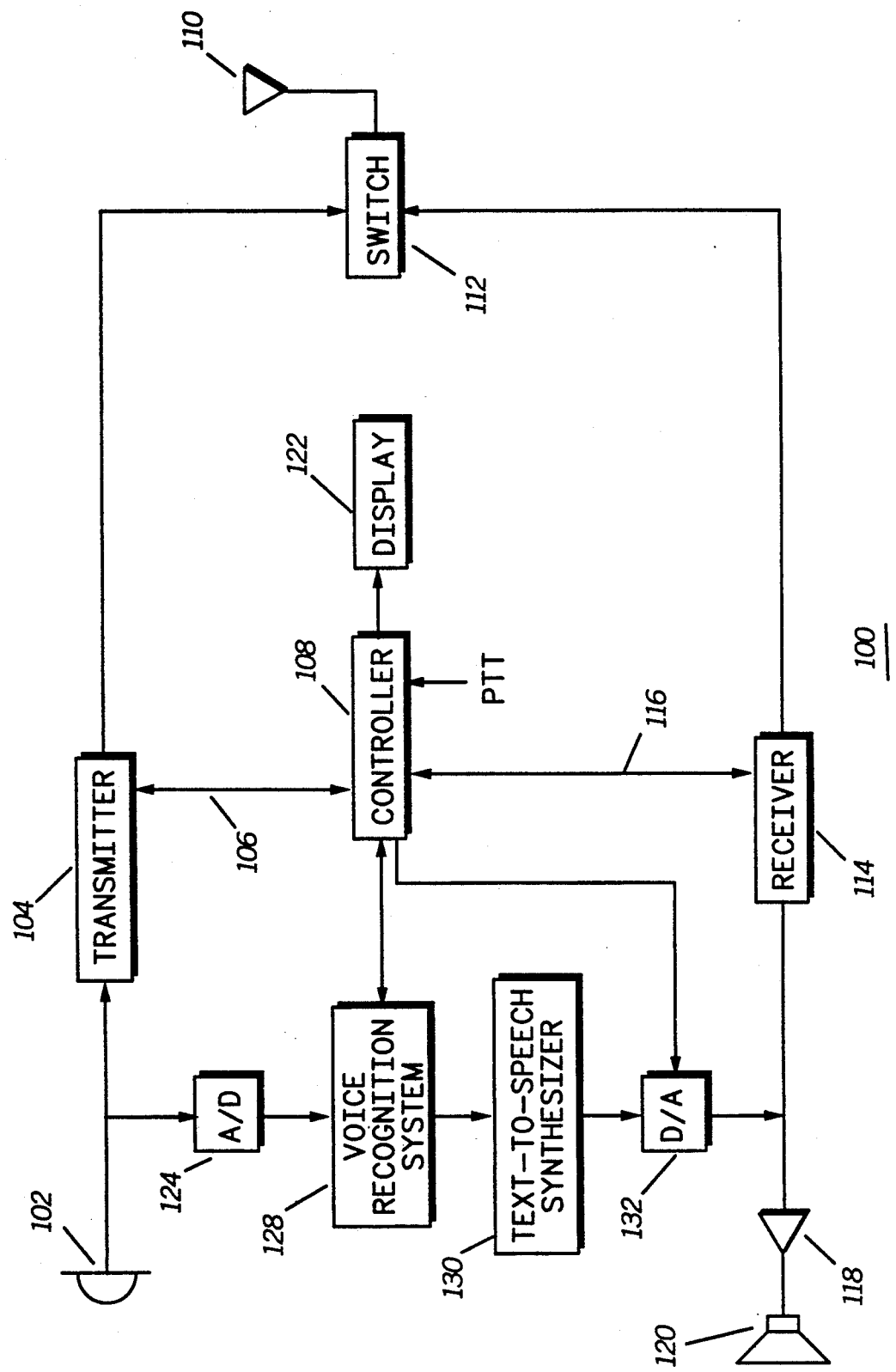
FIG. 1 is a block diagram of a communication device in accordance with the present invention.

Referring to FIG. 1, a communication device 100 is illustrated in block diagram form. Preferably, the communication device 100 comprises a land mobile two-way radio frequency communication device, such as the SPECTRA radio manufactured by Motorola, Inc, but the present invention need not be limited thereto. To transmit an information signal, voice information received by a microphone 102 is provided to a transmitter 104 that is controlled (106) by a controller 108. The controller 108, may be any suitable microprocessor, microcomputer, or microcontroller, and preferably comprises a MC 68030 manufactured by Motorola, Inc., or its functional equivalent. The transmitter 104 is selectively coupled to an antenna 110 via a switch 112. In this way, an information signal is transmitted to other communication units so that two-way radio frequency communication may commence.

To receive a signal, the antenna 110 is selectively coupled (112) to a receiver 114, which is also controlled (116) via the controller 108. The receiver 114 provides a recovered voice signal to an amplifier 118, which presents the recovered information to the operator via a speaker 120.

According to the invention, the controller 108 presents a menu to the operator via a display 122. The display 122 may be any suitable display device, but preferably comprises a liquid crystal display (LCD) device.

The display 122 presents to the operator various menus that associate the limited set of words or instructions that can be recognized to various, more sophisticated, functions necessary to control the communication unit 100.

Accordingly, the communication unit 100 may be operated by voice commands received via the microphone 102 and routed to an analog-to-digital (A/D) converter 124. The digitized command words are provided to a speaker independent voice recognition system 128, which preferably comprises an off-the-shelf voice processing part provided by the Voice Processing Corporation, or the Voice Recognition Module (VRM) manufactured by American Telephone and Telegraph (AT&T), or functional equivalents thereof. These voice recognition modules comprise speaker independent modules designed to receive a limited set of words or commands. Although many different limited word sets are possible, typical speaker independent word set are limited to the numbers zero through nine, and one or more other words such as "call" or "dial" to facilitate the hands free dialing of a telephone or similar device.

To compensate for the limited number of recognizable words, the present invention contemplates associating the limited word set to various functions or operational parameters (or portions thereof) of the communication unit 100 as menu items in a one or more menu(s). As used herein, a limited recognizable word set means a list of recognizable words that is less in number than is required to sufficiently implement a suitable amount of control or the communication unit 100. Thus, the present invention uses dynamically varying associations of all or a portion of the limited word set to communication unit functions (or portions thereof). The command-/function association will be changed as required to present a sufficient number of commands to effect suitable control of the communication device 100.

Operationally, the individual using the communication device 100 peruses the display 122 noticing the current association of the limited set of recognizable words and a selected function (or portions thereof) of the communication unit 100. By noting the current association and speaking the appropriate recognizable control word, the individual can control the communication unit 100 as will becomes more fully apparent in conjunction with FIG. 2.

Since several different associations of functions (or portions thereof) may be necessary to fully control the communication unit 110, it is possible that the individual operating the communication 100 may forget the current association of the limited recognized voice set and their functions. Accordingly, upon recognizing a predetermined word (or words), the voice recognition system 128 forwards information to a text-to-speech synthesizer 130, which preferrably comprises MITalk, which is licensable through M.I.T., the functional equivalent thereof. The text-to-speech converter 128 converts digital information representing the current command-/function association into an information signal that is converted to speech in a digital-to-analog (D/A) converter 132. This signal is interjected into the receive signal path just prior to the amplifier 118 so that the signal can be presented to the operator via the speaker 120. In this way, the individual can be prompted as to the current association of functions and the recognizable voice set at any particular time.

Figure 2:
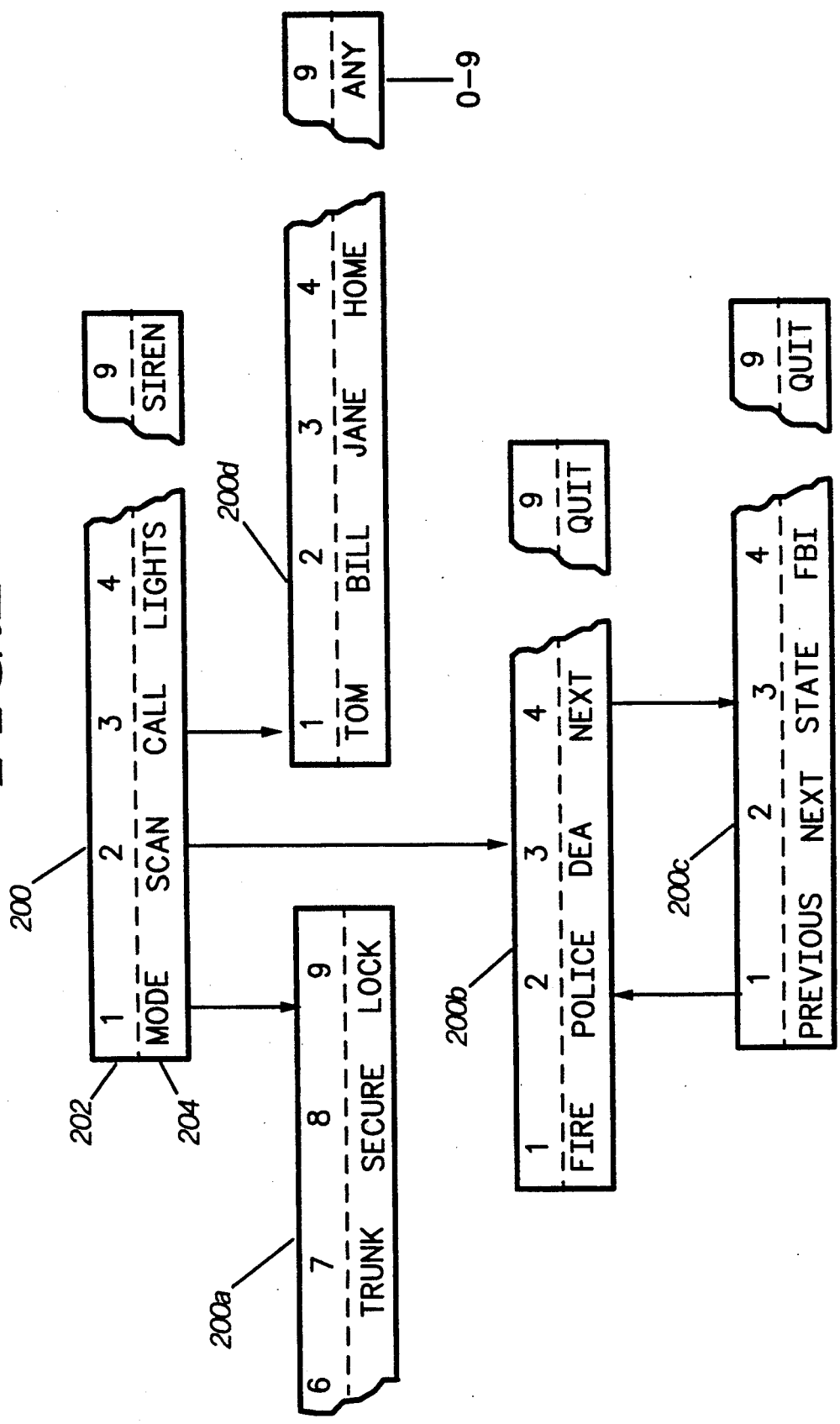
FIG. 2 is an illustration of an exemplary menu tree in accordance with the present invention.

Referring to FIG. 2, there is shown an exemplary illustration of the display 122. According to the invention, many different functions (or portions thereof) are dynamically associated will all (or a portion) of the limited set of recognizable words or numbers. By dynamically varying these associations the information required to initiate a command or function can be entered piece-by-piece. In the preferred embodiment, the current association of recognizable word (or number) and function (or portions thereof) is provided to an operate via a menu-type display. Additionally, the currently association may be made audio via a speech synthesizer so that the operator may effectively control a device while engaged in other activity (such as driving a vehicle).

For clarity, only a portion of the display 122 is illustrated so that some of the functions necessary to control the communication unit 100 may be explained. The display 200 is shown as a rectangular display having an upper portion 202 and a lower portion 204. Preferably, both portions comprise part of an LCD display, which can be programmed (or driven) to display any conventional alpha numeric characters. Alternately graphical symbols may be used to identify selected functions of the communication unit 100.

As can be seen in FIG. 2, the upper portion 202 of the display 200 has been programmed to display the numbers one through nine. This represents a portion of the limited voice set that the speaker independent voice system 128 can recognize. The lower portion 204 of the display 200 has been programmed to display selected functions (or features) useful in the control or coordination of the communication unit 100.

Generally, many functions useful in controlling the communication unit 100 require multiple portions of information before the function can be performed. Thus, the present invention contemplates the use of a series of "menus" (display presentations) so that the required information can be provided piece-by-piece until sufficient information has been received to fully execute a function. For example, to vary the mode of the communication unit 100, the radio operator would speak the number "one", since the mode function is associated in the display 200 with the number one of the limited words set that can be recorganized by the voice recognition system 128. This causes the controller 108 to change the menu on the display 122 to that of the display 200a (a portion of which is shown to illustrate some of the modes that the communication unit 100 many operate in). That is, by saying "one" the communication unit can determine that the operator desires to change the operational mode of the communication unit, but does not yet know which mode the user desires to enter (unless, or course, there are only two operational modes allowed in a particular implementation). Thus, the menu 200a provides the various options that are available under the "Mode" category. Therefore, to enter a trunked operational mode, the individual would next say the word "seven", since the trunked mode is currently associated with the number seven. Thus, the total commands before the communication unit would act change modes would be "one", "seven". Of course, a limited word set could be used in place of the limited number set discussed. In fact, the particular word/number set used may be somewhat predetermined or directed by the words or numbers chosen for implementation by the manufacturer of the voice recognition system or module used in any particular embodiment.

Some functions of the communication unit 100 need only one piece of information to activate, such as, for example, "Siren". To activate the siren, the individual need only speak the word "nine" from the menu 200, since no other information is necessary for the communication unit to act. Optionally, if there were various types of sirens available, a sub-menu would be necessary to allow the operator to enter the next piece of information necessary before the function could be initiated.

As another example, the individual may say the number "two" to enter the "Scan" function since scanning is associated with the number two at the main menu level of the menu 200. This would cause the display 122 to display change to the display 200b, which illustrate some of the various agencies that may be scanned by the communication unit 100. In the scan function, the operator is permitted to enter multiple agencies to be scanned (the number of which may exceed the limed set of words available for association). Accordingly, the present invention contemplates that one association could be the "Next" command (shown associated with the number four), which causes the display 122 to display the sub-menu 200c. Of course, the converse function is provided by the association of the word "Previous" with the number one as seen in the display 200c, which would allow the user to go back to the previous menu to make another selection. Therefore, if the individual decided to scan the police, fire, and the FBI, the appropriate command sequence from the main menu 200 would be "two", "one", "two", "four", "four", and "nine" (to quit adding to the scan list and exit the scan function). This causes the display to return to the main menu 200 and the activation of the scanning the selected agencies. In this way, any number of sub-menus can be displayed in a "tree" (or tiered) approach using functions such as "Next" and "Previous" associated with certain of the recognizable character set of the speech recognition unit 128.

In yet another example, the individual may desire to make a telephone type call (commonly referred to as an "interconnect" call) wherein the communication unit 100 operates to interconnect with a private or public telephone network as is known in the art. Some telephone numbers may be preprogrammed so as to enable the operator to call these preprogrammed telephone numbers by associating the name or number of the individual to be called with one of the recognizable words or characters. Thus, for the individual to call his home, he may say the number "three" from the menu 200 causing the display to be changed to the menu 200d, which changes the associations of the limited word set to that shown. Then, by saying the number "four", an interconnect call to the individual's home would be automatically made. As previously discussed, any number of individuals could be appended via the use of sub-menus using the "Next" and "Previous" commands (or their equivalent) as desired in any particular implementation. Also, should the individual desire to call a new number (i.e., a number that is not associated in the list), he may speak the number "nine" from the menu 200d, which is associated with the "Any" number function. This would cause the speaker independent voice recognition system 128 to operate to receive the numbers zero through nine as though it were dialing a telephone by a voice command. In this way, complicated functions necessary to control the communication 100 may be entered piece-by-piece using menus and sub-menus with functions (or portions thereof) associated with a limited set of recognizable words or characters.

In the preferred embodiment of the present invention, the communication unit 100 does not perform the function until it receives all the information necessary to properly perform that function. Accordingly, the operator is prompted with other menus so that each piece of information necessary to complete the function can be provided.

Referring to FIG. 3, a flow diagram illustrating the steps necessary to implement the present invention is shown. The routine begins in step 300, where the main menu is displayed via display 122. Following this, a voice signal containing one or more of the limited voice recognition set is received in step 302. Decision 304 determines whether the voice command has been recognized as one of the limited set of voice commands (or words) recognizable by the voice recognition system 128. If not, an error message is presented (306) to the operator in the form of a displayed message or an audible tone. Following this, the routine returns to the main menu in step 300. However, if the voice command is recognized, the routine proceeds to step 308, which determines whether a command associated with the "Recite Menu" function has been received. According to the invention, upon receiving one or more predetermined voice commands, the communication unit 100 operates to synthesize the current association of the limited character set and communication unit functions, which is presented in an audible form via the speaker 120. Thus, at any point in the menu/sub-menu structure, the operator may say "menu" or "zero" to trigger the automatic presentation of the current command/function association. Therefore, if this command has been received, the current associations are synthesized in step 310 and then the routine proceeds to step 302 to receive the voice signal after the association has been provided.

Assuming that the determination of decision 308 is that the "Recite Menu" command was not received, the routine proceeds to decision 312, which determines whether an "Abort" (or cancel) command was received. If at any time in a sub-menu the "Abort" command is received, the routine automatically returns to display the main menu 200 (step 300). However, if the "Abort" command was not received in decision 312, the routine proceeds to step 314, which determines whether more information is required to initiate to function. If no further information is required to perform the function, the routine proceeds to step 316, where the function is performed; after which the display 122 displays the main menu 200 (step 300). However, if more information is needed, the routine proceeds to step 318, which display one of the sub-menus necessary to obtain information to complete the function.

After displaying another menu, the routine proceeds to decision 320, which determines whether a voice command has been received. If so, the routine proceeds to decision 304, which determines whether the voice command can be recognized and the routine continues as discussed previously. However, if a voice command was not received, the routine proceeds to decision 322, which determines whether a timer has expired. According to the invention, the controller 108 executes a software time-out routine after entering a sub-menu to prompt the user to provide more information necessary to complete the function desired. If the time-out timer expires before a valid command is recognized, the routine proceeds to step 324 where an error message is presented by a display, audible tone, or synthesized voice signal prior to return to the main menu (step 300). However, if the timer has not expired, the routine returns to decision 320, which determines whether a voice signal has been received.

In this way, the present invention operates to perform functions via association of these functions (or portions thereof) with a limited set of recognizable words or commands. When receiving these commands, the present invention operates to collect all the information necessary to perform the command prior to the function execution prompting the operator through one or more levels (or sub-levels) of requests for information. When all the information necessary to perform a function has been received, the function is then automatically executed by the communication device 100. Thus, a complicated communication device may be fully controlled via a speaker independent voice technology having a limited set of recognizable words commands.

What is claimed is:

1. A method for controlling a device via voice command, comprising the steps of:
    (a) receiving a voice signal representing one of a limited set of words or commands;
    (b) selecting an item from a set of items associated with at least some of the limited set of words or commands to provide a selected item;
    (c) performing a function associated with said selected item when no additional information is required to perform the function, and presenting another set of items associated with at least some of substantially the same limited set of words or commands when additional information is required to perform the function;
    (d) presenting a set of items associated with at least some of the limited set of words when a voice signal representing a command to present said set of items is received.

2. A method for controlling a device via voice command, comprising the steps of:
    (a) receiving a speaker independent voice signal representing one of a limited set of words or commands;
    (b) selecting an item from a set of items associated with at least some of the limited set of words or commands to provide a selected item;
    (c) performing a function associated with said selected item when no additional information is required to perform the function, and presenting another set of items associated with at least some of substantially the same limited set of words or commands when additional information is required to perform the function;
    (d) presenting a set of items currently associated with at least some of the limited set of words or commands when a voice signal representing a command to present said set of items is received.

3. A method for controlling a device via voice command, comprising the steps of:
    (a) receiving a speaker independent voice signal representing one of a limited set of words or commands;
    (b) selecting an item from a set of items associated with at least some of the limited set of words or commands to provide a selected item;
    (c) performing a function associated with said selected item when no additional information is required to perform the function, and presenting another set of items associated with at least some of substantially the same limited set of words or commands when additional information is required to perform the function;
    (d) presenting a synthesized voice signal describing a set of items currently assocaited with at least some of the limited set of words when a voice signal representing a command to describe by synthesized voice signal is received.

4. A method for controlling a device via voice command, comprising the steps of:
    (a) receiving a speaker independent voice signal representing one of a limited set of words or commands;
    (b) selecting an item from a set of items associated with at least some of the limited set of words or commands to provide a selected item;
    (c) performing a function associated with said selected item when no additional information is required to perform the function, and presenting another set of items associated with at least some of substantially the same limited set of words or commands when additional information is required to perform the function;
    (d) presenting a visual display of a set of items currently associated with at least some of the limited set of words when a voice signal representing a command to present said set of items is received.

5. A device capable of being at least partially controlled via voice command, comprising:
    (a) a speaker independent voice recognition means for receiving a voice signal representing one of a limited set of words or commands;
    (b) means for selecting an item from a set of items associated with at least some of the limited set of words or commands to provide a selected item;
    (c) means for performing a function associated with said selected item when no additional information is required to perform the function, and means for displaying another set of items associated with at least some of substantially the same limited set of words when additional information is required to perform the function;
    (d) means for presenting a set of items associated with at least some of the limited set of words or commands when a voice signal representing a command to present said set of items is received.

6. A device capable of being at least partially controlled via voice command, comprising:
    (a) a speaker independent voice recognition means for receiving a voice signal representing one of a limited set of words or commands;
    (b) means for selecting an item from a set of items associated with at least some of the limited set of words or commands to provide a selected item;
    (c) means for performing a function associated with said selected item when no additional information is required to perform the function, and means for displaying another set of items associated with at least some of substantially the same limited set of words when additional information is required to perform the function;
    (d) means for presenting a set of items currently associated with at least some of the limited set of words when a voice signal representing a command to present the set of items is received.

7. The device of claim 6, wherein the means for presenting comprises a voice synthesizer means.

8. The device of claim 6, wherein the means for presenting comprises a display means.

* * * * *